(12) United States Patent
Dahan (10) Patent No.: US 9,736,222 B1
(45) Date of Patent: Aug. 15, 2017

(54) SYSTEM, METHOD, AND COMPUTER PROGRAM FOR AUTOMATICALLY EXPOSING APPLICATION PROGRAMMING INTERFACES (APIS) ASSOCIATED WITH AN APPLICATION SERVER TO ONE OR MORE CLIENT DEVICES

(71) Applicant: Amdocs Software Systems Limited, Dublin (IE)

(72) Inventor: Eliad Dahan, Kfar Tavor (IL)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 435 days.

(21) Appl. No.: 14/180,291

(22) Filed: Feb. 13, 2014

Related U.S. Application Data (60) Provisional application No. 61/816,749, filed on Apr. 28, 2013.

(51) Int. Cl.
  *G06F 15/16* (2006.01)
  *H04L 29/08* (2006.01)
  *H04L 29/06* (2006.01)

(52) U.S. Cl.
  CPC .............. *H04L 67/10* (2013.01); *H04L 67/42* (2013.01)

(58) Field of Classification Search
  CPC ..... H04L 51/18; H04L 67/28; H04L 67/2823; H04L 67/12; H04L 67/14; H04L 67/20; H04L 12/2803; H04L 12/2832; H04L 29/08846; H04L 69/08; H04L 12/2805
  USPC ........ 709/201, 202, 203, 227, 228, 246, 249
  See application file for complete search history.

(56) References Cited

U.S. PATENT DOCUMENTS

| | | | | |
|---|---|---|---|---|
| 2002/0078259 A1* | 6/2002 | Wendorf | ............. | H04L 12/2805 719/328 |
| 2003/0009588 A1* | 1/2003 | Bodlaender | ......... | H04L 12/2803 709/238 |
| 2003/0200272 A1* | 10/2003 | Campise | ................. | H04L 51/28 709/206 |
| 2008/0208972 A1* | 8/2008 | Chou | ..................... | H04L 67/14 709/204 |

(Continued)

Primary Examiner — Edward Kim
(74) Attorney, Agent, or Firm — Zilka-Kotab, PC (57) ABSTRACT

A system, method, and computer program product are provided for automatically exposing application programming interfaces (APIs) associated with an application server to one or more client devices. In use, at least one API signature corresponding to at least one API is retrieved from at least one application server. Additionally, first information associated with one or more parameters corresponding to each of the at least one API signatures is retrieved from the at least one application server. Further, second information associated with one or more response parameters corresponding to each of the at least one API signatures is retrieved from the at least one application server. In addition, at least one Simple Object Access Protocol (SOAP) Extensible Markup Language (XML) message is automatically generated, including the at least one API signature, the first information associated with the one or more parameters, and the second information associated with the one or more response parameters. Furthermore, the SOAP XML message is provided to a client device.

9 Claims, 8 Drawing Sheets

(56) References Cited

U.S. PATENT DOCUMENTS

| | | | |
|---|---|---|---|
| 2008/0222238 A1* | 9/2008 | Ivanov | H04L 67/16 |
| | | | 709/202 |
| 2009/0157627 A1* | 6/2009 | Arthursson | G06F 9/45504 |
| 2009/0172101 A1* | 7/2009 | Arthursson | G06F 3/0486 |
| | | | 709/205 |
| 2010/0077083 A1* | 3/2010 | Tran | H04L 67/325 |
| | | | 709/227 |
| 2012/0221620 A1* | 8/2012 | Kocyan | G06F 9/547 |
| | | | 709/201 |
| 2013/0074151 A1* | 3/2013 | Lin | G06F 9/54 |
| | | | 726/3 |

* cited by examiner

SYSTEM, METHOD, AND COMPUTER PROGRAM FOR AUTOMATICALLY EXPOSING APPLICATION PROGRAMMING INTERFACES (APIS) ASSOCIATED WITH AN APPLICATION SERVER TO ONE OR MORE CLIENT DEVICES

CLAIM OF PRIORITY

This application claims the benefit of U.S. Provisional Application No. 61/816,749, filed Apr. 28, 2013, the entire contents of which are incorporated herein by reference.

FIELD OF THE INVENTION

The invention relates generally to the ability to call software interfaces (e.g. Enterprise JavaBeans, Web Services, etc.) with minimal configuration and implementation.

BACKGROUND

Software developers require the ability to call developed software interfaces, in the cases of black box testing, etc. Typically, in order to call developed interfaces, software developers need to develop client code for each specific interface.

For example, in most software development projects, a software developer creates a client simulator for each interface of the software in order to run black box tests. This is a time consuming effort. There is thus a need for addressing these and/or other issues associated with the prior art.

SUMMARY

A system, method, and computer program product are provided for automatically exposing application programming interfaces (APIs) associated with an application server to one or more client devices. In use, at least one API signature corresponding to at least one API is retrieved from at least one application server. Additionally, first information associated with one or more parameters corresponding to each of the at least one API signatures is retrieved from the at least one application server. Further, second information associated with one or more response parameters corresponding to each of the at least one API signatures is retrieved from the at least one application server. In addition, at least one Simple Object Access Protocol (SOAP) Extensible Markup Language (XML) message is automatically generated, including the at least one API signature, the first information associated with the one or more parameters, and the second information associated with the one or more response parameters. Furthermore, the SOAP XML message is provided to a client device.

DETAILED DESCRIPTION

Figure 1:
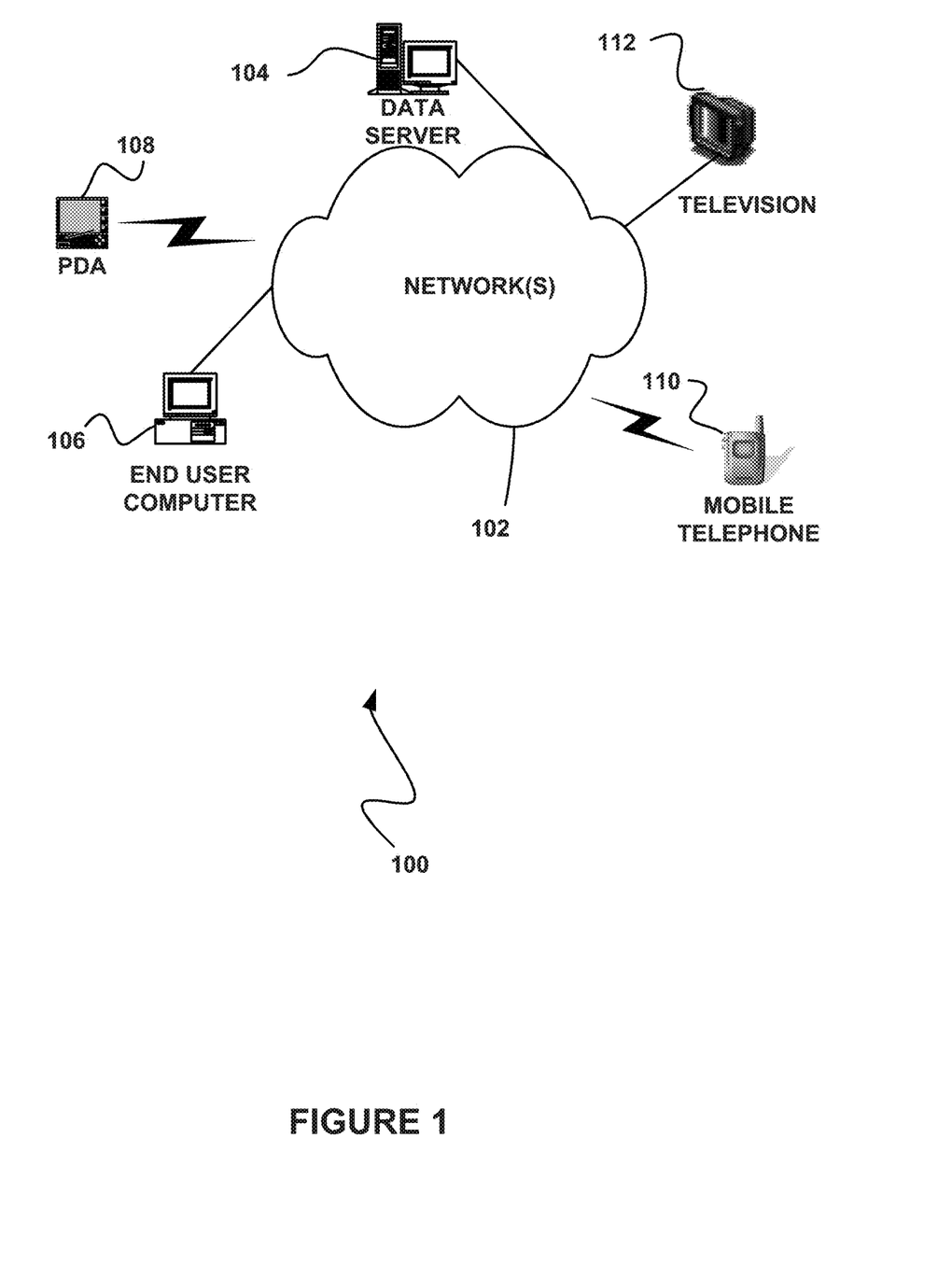
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
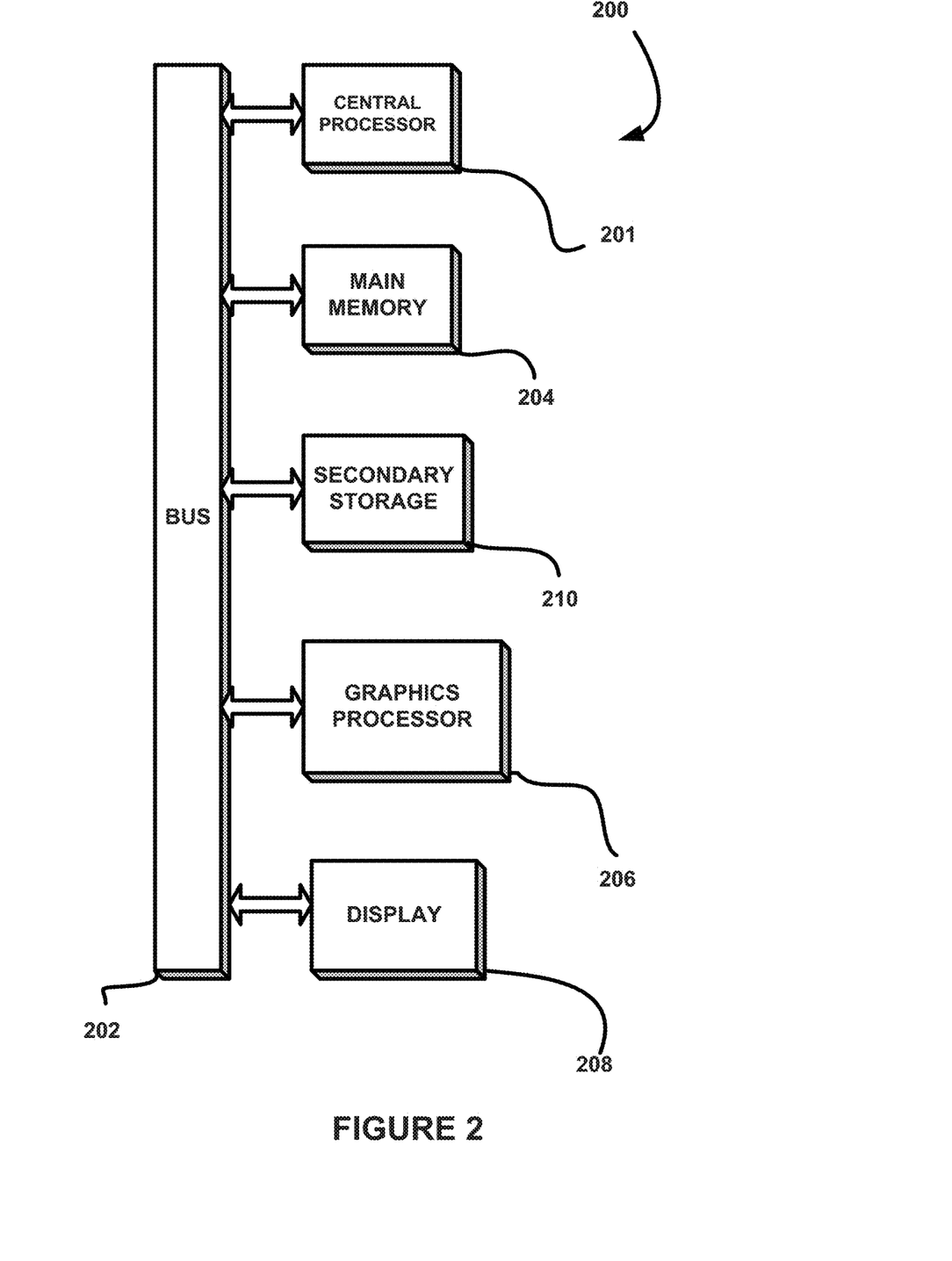
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
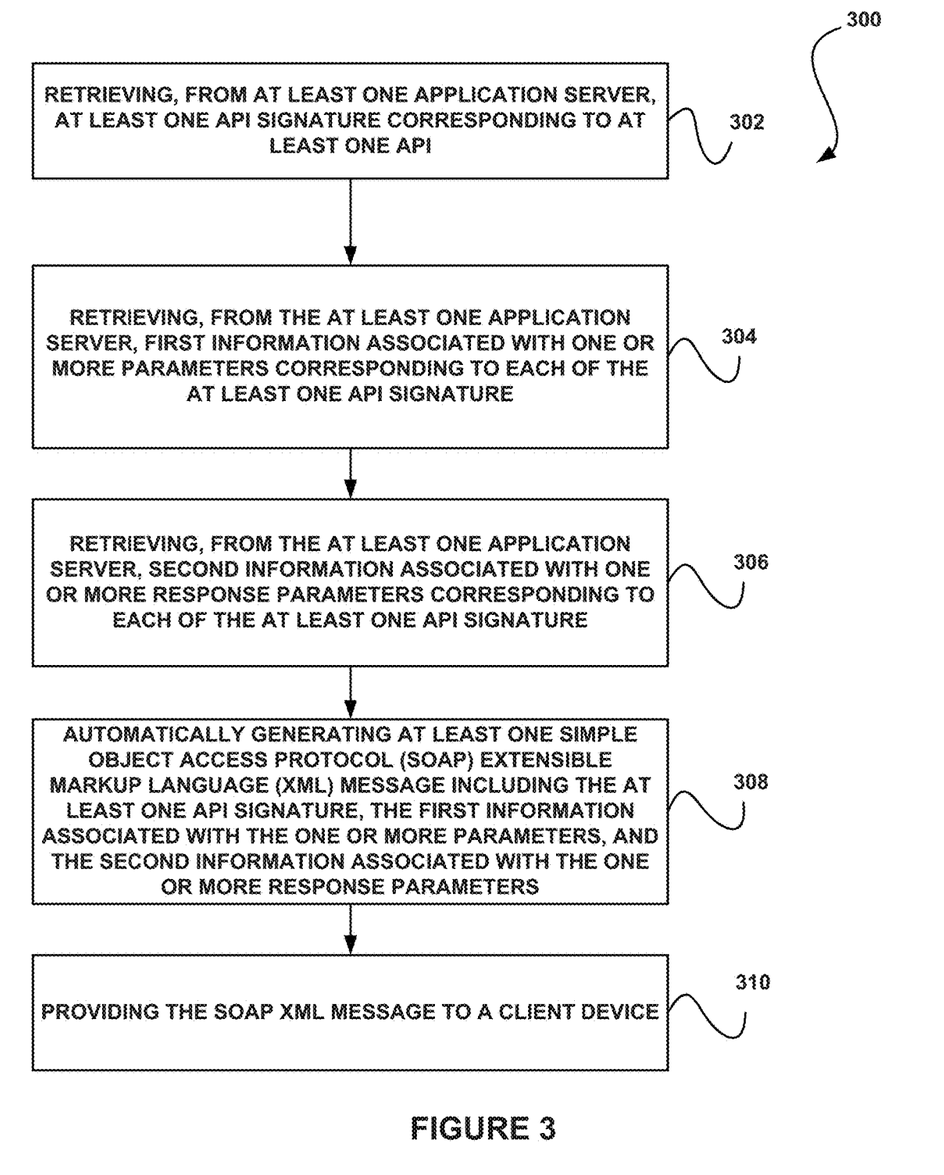
FIG. 3 illustrates a method for automatically exposing application programming interfaces (APIs) associated with an application server to one or more client devices, in accordance with one embodiment.

FIG. 3 illustrates a method 300 for automatically exposing application programming interfaces (APIs) associated with an application server to one or more client devices, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, at least one API signature corresponding to at least one API is retrieved from at least one application server. See operation 302. The application server may include any type of server that is associated with one or more APIs. In one embodiment, the application server may include a plurality of APIs and signatures associated therewith. In another embodiment, the application server may include a server in communication with a plurality of application servers.

The API signature may include any information associated with a particular API, which may be capable of being used as a signature. For example, the API signature may include identification information associated with a particular API. Furthermore, the API may include any type of API. For example, the API may include an API associated with a business. As another example, the API may be associated with a desktop application. As another example, the API may be associated with a server application.

Additionally, first information associated with one or more parameters corresponding to each of the at least one API signatures is retrieved from the at least one application server. See operation 304. The information may include any information associated with the parameters. For example, in one embodiment, the information may include parameter fields. In another embodiment, the information may include parameter values. Furthermore, the parameters may include any parameter associated with an API. For example, in on embodiment, the parameters may include input parameters.

Further, second information associated with one or more response parameters corresponding to each of the at least one API signatures is retrieved from the at least one application server. See operation 306. The second information may include any information associated with the response parameters. For example, in one embodiment, the information may include response parameter fields. In another embodiment, the information may include response parameter values.

In addition, at least one Simple Object Access Protocol (SOAP) Extensible Markup Language (XML) message is automatically generated. In this case the SOAP XML message includes the at least one API signature, the first information associated with the one or more parameters, and the second information associated with the one or more response parameters. See operation 308. Of course, the at least one API signature, the first information associated with the one or more parameters, and the second information associated with the one or more response parameters may be formatted according to SOAP XML message protocol.

Furthermore, the SOAP XML message is provided to a client device. See operation 310. The client device may include any type of device. In one embodiment, the client device may include a computer. As an option, the client device may be associated with a rich client platform (RCP) developer suite.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
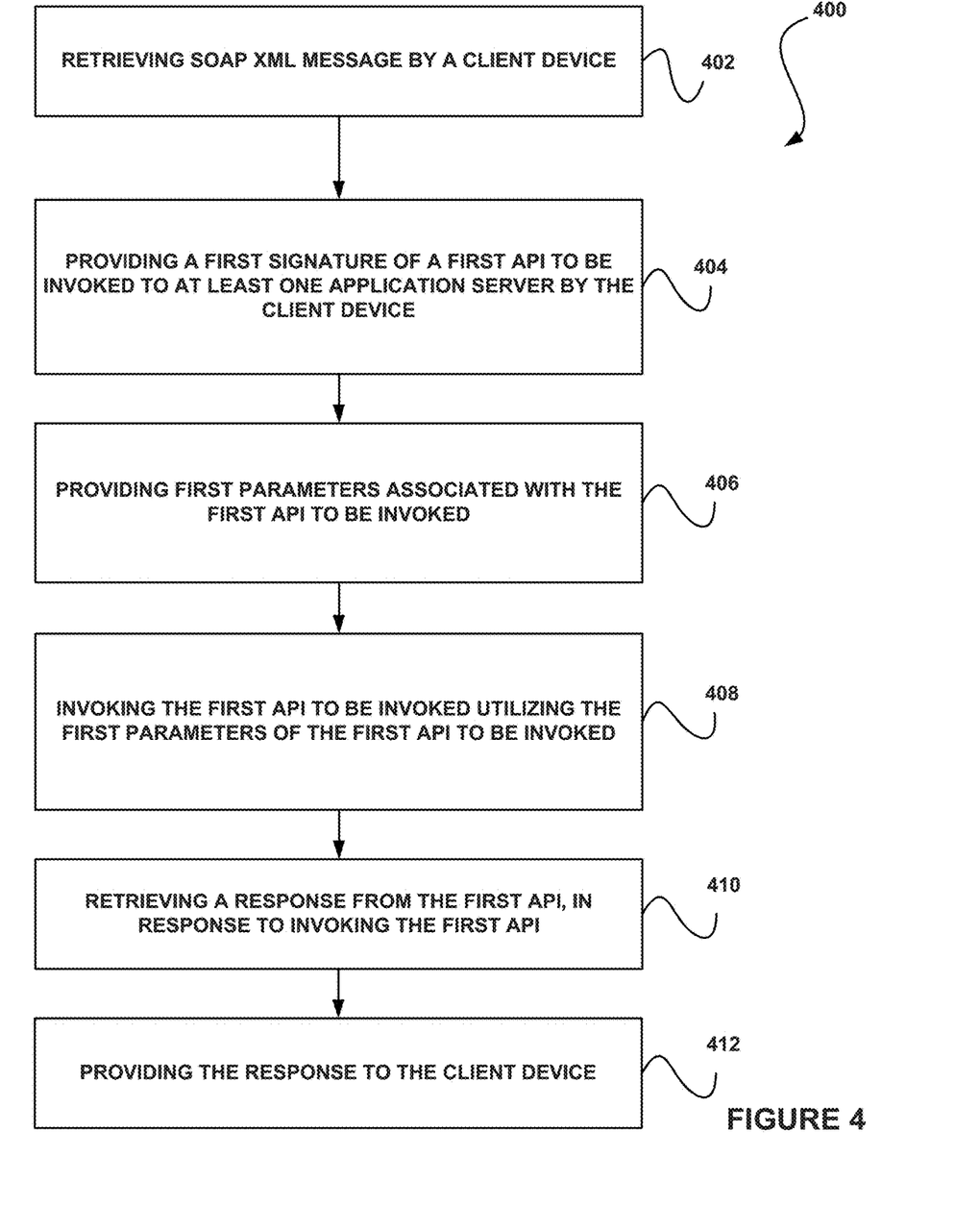
FIG. 4 illustrates a method for automatically exposing APIs associated with an application server to one or more client devices, in accordance with one embodiment.

FIG. 4 illustrates a method 400 for automatically exposing APIs associated with an application server to one or more client devices, in accordance with one embodiment. As an option, the method 400 may be implemented in the context of the details of FIGS. 1-3. Of course, however, the method 400 may be implemented in the context of any desired environment. Further, the aforementioned definitions may equally apply to the description below.

As shown, an SOAP XML message is retrieved by a client device. See operation 402. In this case, the SOAP XML message may include the at least one API signature, the first information associated with the one or more parameters, and the second information associated with the one or more response parameters, as described in the context of FIG. 3.

As shown further, a first signature of a first API to be invoked is provided to at least one application server by the client device. See operation 404. In this case, the first signature of the first API is one of the at least one API signatures included in the SOAP XML message.

Additionally, first parameters associated with the first API to be invoked are provided. See operation 406. The first parameters associated with the first API to be invoked correspond to the first information associated with the one or more parameters included in the SOAP XML message. For example, the first parameters may include one or more parameters included in the SOAP XML message corresponding to the API that is to be invoked.

Further, the first API is invoked utilizing the first parameters of the first API. See operation 408. In this case, the first API is invoked on the at least one application server. In one embodiment, the first API may be invoked on the at least one application server in response to receiving the first API and the first parameters.

With further reference to FIG. 4, a response is retrieved from the first API, in response to invoking the first API. See operation 410. In this case, the response is retrieved from the application server.

Additionally, the response is provided to the client device. See operation 412. In one embodiment, the response may be provided to the client device by the at least one application server, in response to invoking the first API.

In one embodiment, the method 400 may further include displaying at least one interface for selecting the first API to be invoked. Further, in one embodiment, at least one interface may be displayed for selecting the first parameters of the first API to be invoked. Still yet, at least one interface may be displayed for receiving interface field values associated with the first interface to be invoked. Moreover, in one embodiment, a configuration associated with the first API and the first parameters may be saved for future use (e.g. utilizing one of the interfaces, etc.).

In one embodiment, the method 300 and/or the method 400 may be implemented by a system to test new and existing software interfaces during black box testing.

For example, in most software development projects, a software developer creates a client simulator for each interface of the software in order to run black box tests. This is a time consuming effort. Accordingly, in one embodiment, a webservice may be implemented that provides the ability to retrieve any deployed API signature from any platform (e.g. application server, desktop application, etc.) by connecting to the application server host and port. Furthermore, such webservice may provide the ability to run any deployed interface with a generic webservice protocol containing the public API signature.

Figure 5:
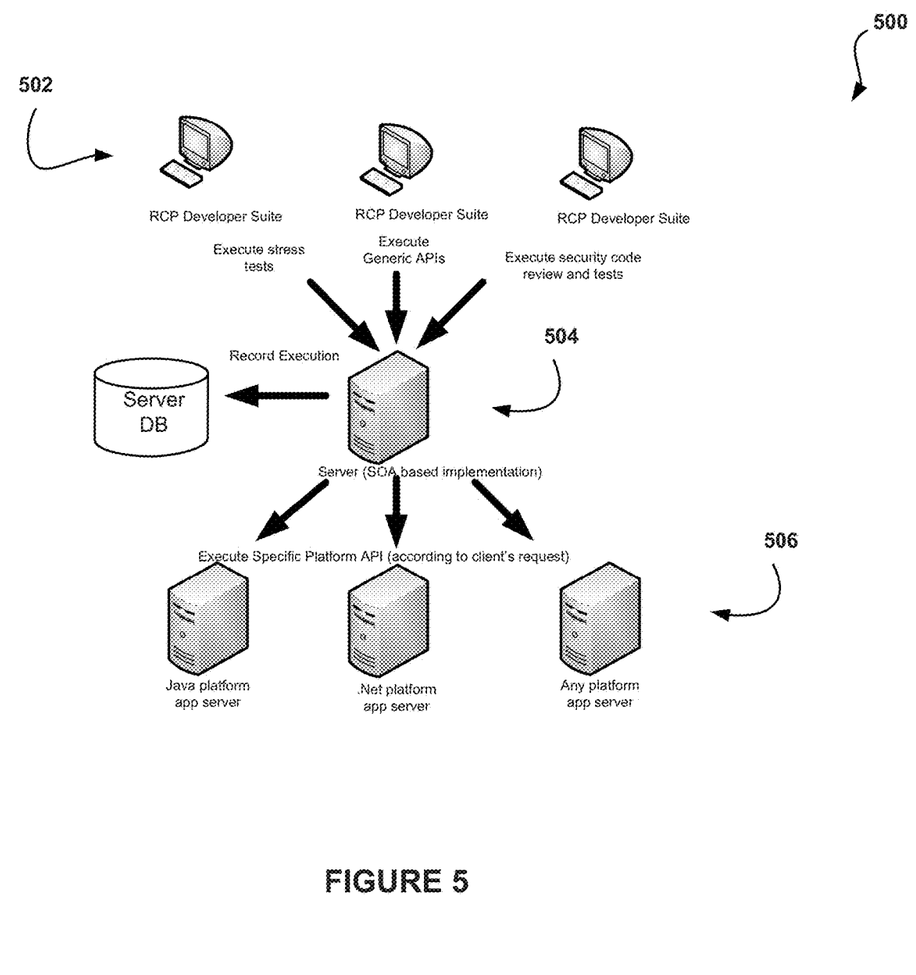
FIG. 5 illustrates a system for automatically exposing APIs associated with an application server to one or more client devices, in accordance with one embodiment.

FIG. 5 illustrates a system 500 for automatically exposing APIs associated with an application server to one or more client devices, in accordance with one embodiment. As an option, the system 500 may be implemented in the context of the details of FIGS. 1-4. Of course, however, the system 500 may be implemented in the context of any desired environment. Further, the aforementioned definitions may equally apply to the description below.

As shown, the system 500 has a client side including a plurality of clients 502 and a server side including at least one server 504 and a plurality of specific application platform servers 506. The server 504 includes a server layer, which is a framework that is deployed on the application server, in the init process. In one embodiment, the server 504 may scan all public APIs exposed on the application servers 506 and translate them into one or more metadata structures (e.g. SOAP webservice).

In this process the server layer may retrieve all public business API signatures. For each signature, the server layer may retrieve the parameters of the API signature. Additionally, for each signature, the server layer may retrieve the response parameter of the API signature. Moreover, the server layer may describe all of the retrieved information in a SOAP XML message.

One of the clients 502 may then call the server 504 to retrieve the list of public APIs. In order to invoke one API with the public API parameters data (e.g. as shown in FIG. 4), the client 502 may call the server 504 with the required server site metadata structure. The server 504 may analyze the data and invoke the relevant API with the data received from the client 502.

For example, the server 504 may read the API signature and its parameters. The server 504 may then build a run time request according to the API signature and its parameters. Further, the server 504 may execute the run time API. Still yet, the server 504 may retrieve the response object from the API and send it back to the caller client 502.

After invocation, the server 504 may send back the API response object to the client 502. In this way, a user can invoke any API on any platform in very fast and easy way, since this process is automatic (e.g. with exception of entering the data on the client side by the end user, etc.).

Accordingly, the system 500 may function to develop a specific protocol over SOAP that defines the API metadata for client display and server invocation (as described regarding the content of the metadata structure, API signature, parameters of APIs and the response object of the API, etc.). Therefore, the end user needs to focus only on the business data aspects to be tested rather than on constructing simulators.

In addition, the system 500 may implement an SOA based application that may be invoked, for example, as a testing tool or as a customer POC engine. There is no dependency on the particular technological layer since all communication is done over a standard webservice SOAP protocol.

Figure 6:
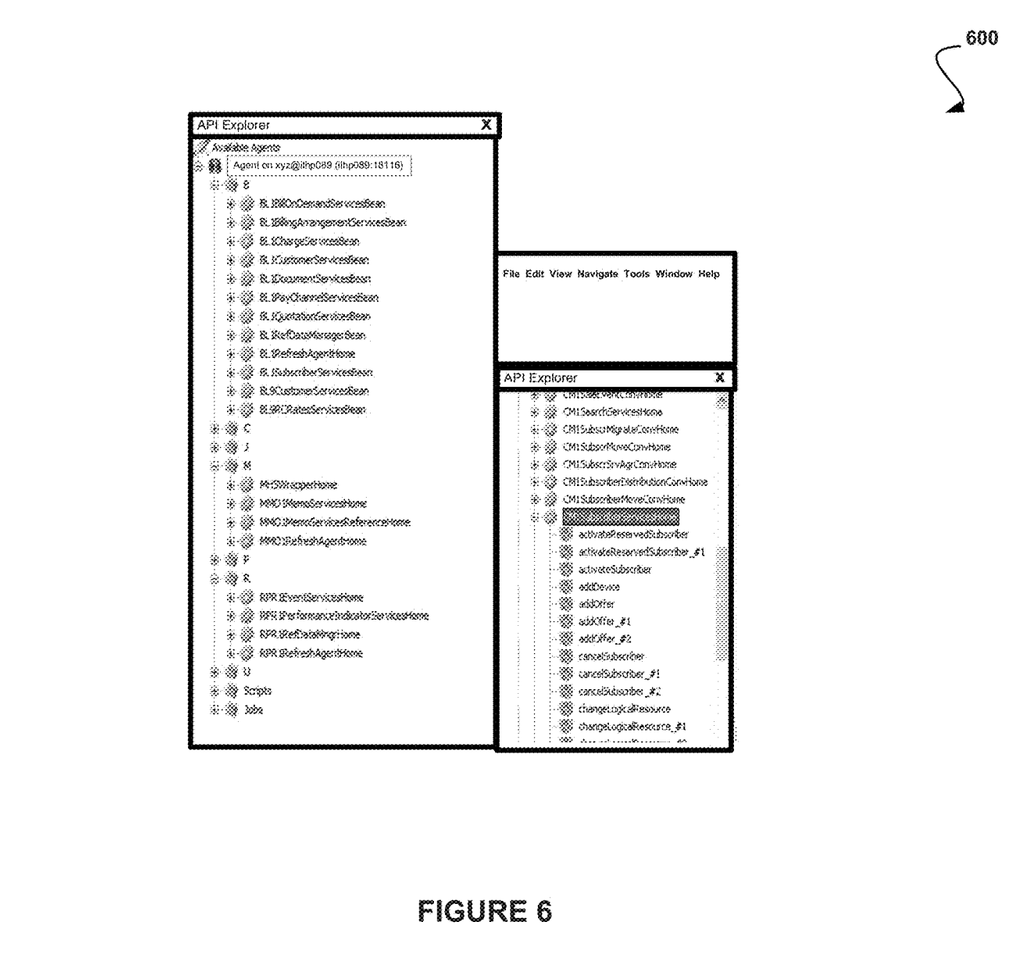
FIG. 6 illustrates a user interface for automatically exposing APIs associated with an application server to one or more client devices, in accordance with one embodiment.
Figure 7:
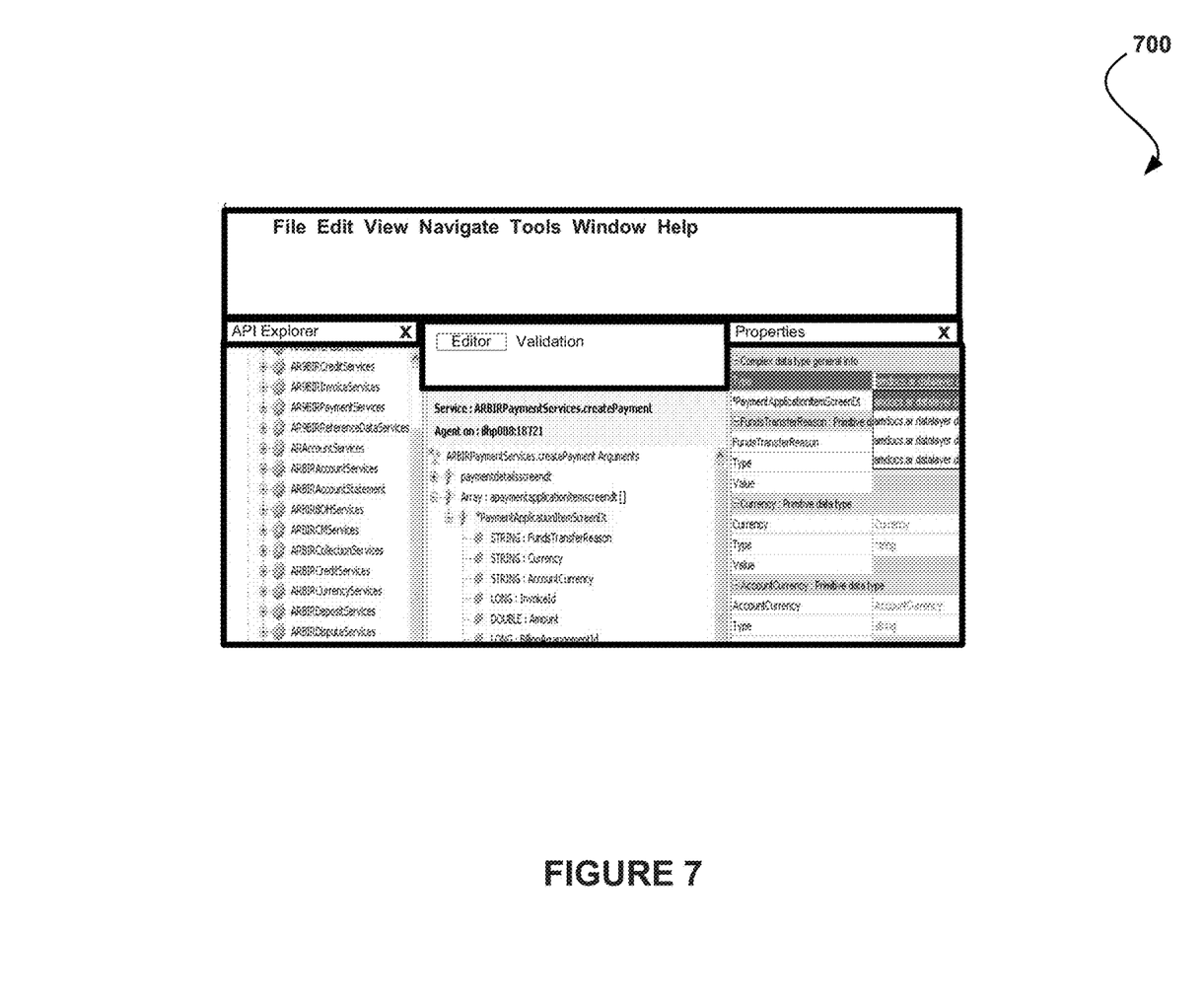
FIG. 7 illustrates a user interface for automatically exposing APIs associated with an application server to one or more client devices, in accordance with one embodiment.
Figure 8:
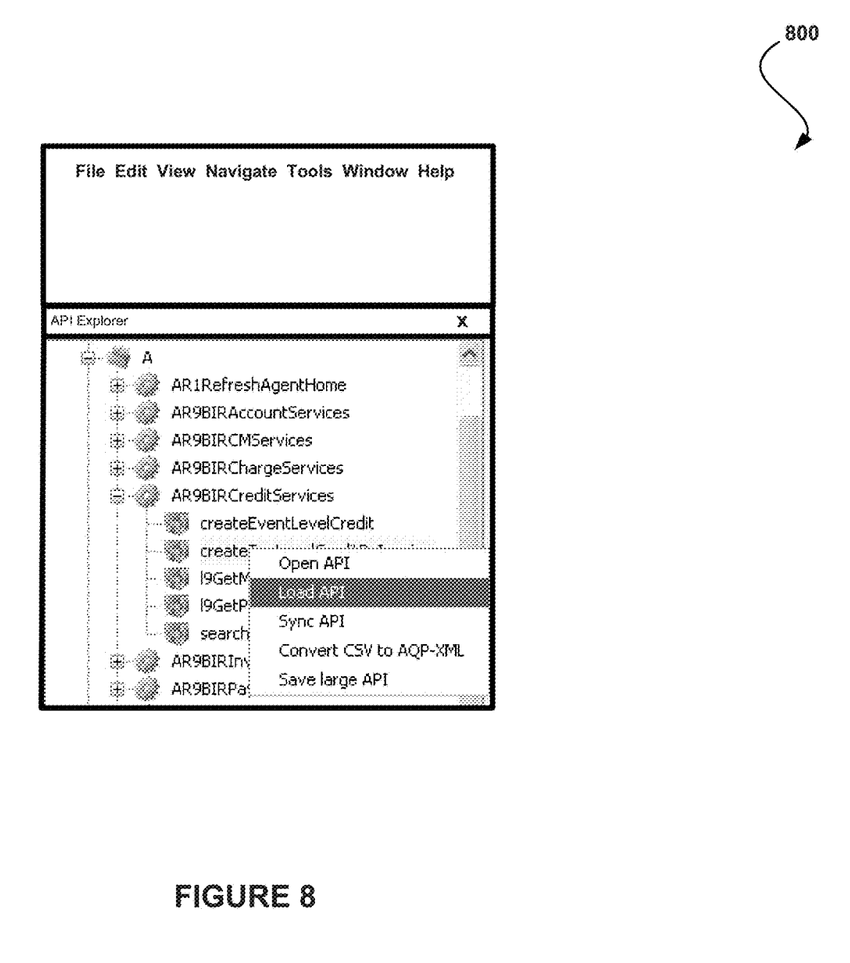
FIG. 8 illustrates a user interface for automatically exposing APIs associated with an application server to one or more client devices, in accordance with one embodiment.

In one embodiment, an agent .war file may be deployed on an application server, and a rich client platform that helps the user to locate an interface (e.g. as shown in FIG. 6), to enter values associated with interface fields (e.g. as shown in FIG. 7), and to save the simulated test for future reuse (e.g. as shown in FIG. 8).

FIG. 6 illustrates a user interface 600 for automatically exposing APIs associated with an application server to one or more client devices, in accordance with one embodiment. As an option, the user interface 600 may be implemented in the context of the details of FIGS. 1-5. Of course, however, the user interface 600 may be implemented in the context of any desired environment. Further, the aforementioned definitions may equally apply to the description below.

As shown, the user interface 600 illustrates an example of a list of interfaces and operations deployed on an application server, as found by the techniques described herein. In operation, a user may use the user interface 600 to explore APIs associated with an application server and explore available agents. Further, a user may use the interface 600 to select an API for invocation.

FIG. 7 illustrates a user interface 700 for automatically exposing APIs associated with an application server to one or more client devices, in accordance with one embodiment. As an option, the user interface 700 may be implemented in the context of the details of FIGS. 1-6. Of course, however, the user interface 700 may be implemented in the context of any desired environment. Further, the aforementioned definitions may equally apply to the description below.

As shown, the user interface 700 illustrates an example interface for entering values to interface fields associated with a selected API for invocation. In one embodiment, highlighted fields may indicate required fields for API invocation.

FIG. 8 illustrates a user interface 800 for automatically exposing APIs associated with an application server to one or more client devices, in accordance with one embodiment. As an option, the user interface 800 may be implemented in the context of the details of FIGS. 1-7. Of course, however, the user interface 800 may be implemented in the context of any desired environment. Further, the aforementioned definitions may equally apply to the description below.

As shown, the user interface 800 may be utilized to invoke a selected API. In one embodiment, a user may have the ability to open an API, load an API, sync an API, and/or save an API, etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for storing, in memory of an application server, a plurality of application programming interfaces (APIs), and storing for each of the APIs:
      an API signature for the API,
      first information including fields of one or more input parameters for the API, and
      second information including fields of one or more response parameters for the API;
   computer code for retrieving, by the application server from the memory, one of the API signatures stored for one of the APIs;
   computer code for retrieving, by the application server from the memory, the first information stored for the one of the APIs;
   computer code for retrieving, by the application server from the memory, the second information stored for the one of the APIs;
   computer code for automatically generating, by the application server, a Simple Object Access Protocol (SOAP) Extensible Markup Language (XML) message including the retrieved API signature, the retrieved first information and the retrieved second information; and
   computer code for exposing, by the application server, the one of the APIs to a client device by providing the SOAP XML message to the client device for use by the client device in invoking the one of the APIs on the application server;

computer code for receiving, by the application server from the client device after exposing the one of the APIs to the client device, the API signature and field values for the fields of the one or more input parameters for the one of the APIs;

computer code, responsive to receiving the API signature and the field values, for invoking, on the application server, the one of the APIs using the received field values;

computer code for retrieving, by the application server, a response from the one of the APIs, the response from the one of the APIs being responsive to the invoking of the one of the APIs;

computer code for providing, by the application server to the client device, the response retrieved from the one of the APIs.

2. The computer program product of claim 1, wherein the computer program product is operable such that the API signature is associated with a desktop application.

3. The computer program product of claim 1, further comprising:

retrieving, by the application server from the memory, a second one of the API signatures stored for a second one of the APIs;

retrieving, by the application server from the memory, the first information stored for the second one of the APIs;

retrieving, by the application server from the memory, the second information stored for the second one of the APIs;

automatically generating, by the application server, a second Simple Object Access Protocol (SOAP) Extensible Markup Language (XML) message including the retrieved second API signature, the retrieved first information stored for the second one of the APIs and the retrieved second information stored for the second one of the APIs; and exposing, by the application server, the second one of the APIs to the client device by providing the SOAP XML message to the client device for use by the client device in invoking the second one of the APIs on the application server.

4. The computer program product of claim 3, further comprising:

receiving, by the application server from the client device after exposing the second one of the APIs to the client device, the second API signature and second field values for the fields of the one or more input parameters for the second one of the APIs;

responsive to receiving the second API signature and the second field values, invoking, on the application server, the second one of the APIs using the received second field values;

retrieving, by the application server, a response from the second one of the APIs, the response from the second one of the APIs being responsive to the invoking of the second one of the APIs;

providing, by the application server to the client device, the response retrieved from the second one of the APIs.

5. The computer program product of claim 1, wherein the application server scans remote application servers to identify the APIs, and in response to the identification of the APIs the application server stores the API signature, the first information, and the second information for each of the APIs.

6. The computer program product of claim 1, further comprising providing, by the application server, the client device with a list of the APIs.

7. The computer program product of claim 1, wherein the SOAP XML message is automatically generated and provided to the client device for use by the client device in performing testing utilizing the one of the APIs.

8. A method, comprising:

storing, in memory of an application server, a plurality of application programming interfaces (APIs), and storing for each of the APIs:

an API signature for the API, first information including fields of one or more input parameters for the API, and second information including fields of one or more response parameters for the API;

retrieving, by the application server from the memory, one of the API signatures stored for one of the APIs;

retrieving, by the application server from the memory, the first information stored for the one of the APIs;

retrieving, by the application server from the memory, the second information stored for the one of the APIs;

automatically generating, by the application server, a Simple Object Access Protocol (SOAP) Extensible Markup Language (XML) message including the retrieved API signature, the retrieved first information and the retrieved second information; and exposing, by the application server, the one of the APIs to a client device by providing the SOAP XML message to the client device for use by the client device in invoking the one of the APIs on the application server;

receiving, by the application server from the client device after exposing the one of the APIs to the client device, the API signature and field values for the fields of the one or more input parameters for the one of the APIs;

responsive to receiving the API signature and the field values, invoking, on the application server, the one of the APIs using the received field values;

retrieving, by the application server, a response from the one of the APIs, the response from the one of the APIs being responsive to the invoking of the one of the APIs;

providing, by the application server to the client device, the response retrieved from the one of the APIs.

9. A system comprising:

a memory system of an application server; and one or more processing cores of the application server coupled to the memory system and that are each configured to:

store, in the memory system of the application server, a plurality of application programming interfaces (APIs), and storing for each of the APIs:

an API signature for the API, first information including fields of one or more input parameters for the API, and second information including fields of one or more response parameters for the API;

retrieve, by the application server from the memory, one of the API signatures stored for one of the APIs;

retrieve, by the application server from the memory, the first information stored for the one of the APIs;

retrieve, by the application server from the memory, the second information stored for the one of the APIs;

automatically generate, by the application server, a Simple Object Access Protocol (SOAP) Extensible Markup Language (XML) message including the retrieved API signature, the retrieved first information and the retrieved second information; and expose, by the application server, the one of the APIs to a client device by providing the SOAP XML message to the client device for use by the client device in invoking the one of the APIs on the application server;

receive, by the application server from the client device after exposing the one of the APIs to the client device, the API signature and field values for the fields of the one or more input parameters for the one of the APIs;

responsive to receiving the API signature and the field values, invoke, on the application server, the one of the APIs using the received field values;

retrieve, by the application server, a response from the one of the APIs, the response from the one of the APIs being responsive to the invoking of the one of the APIs;

provide, by the application server to the client device, the response retrieved from the one of the APIs.

* * * * *